United States Patent
Kurtz et al.

(10) Patent No.: US 8,240,136 B2
(45) Date of Patent: Aug. 14, 2012

(54) SCR CATALYST HEATING CONTROL

(75) Inventors: Eric Matthew Kurtz, Dearborn, MI (US); Paul Joseph Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 12/511,537

(22) Filed: Jul. 29, 2009

(65) Prior Publication Data

US 2011/0023462 A1 Feb. 3, 2011

(51) Int. Cl.
*F01N 3/00* (2006.01)
(52) U.S. Cl. ............................. 60/295; 60/286
(58) Field of Classification Search ............ 60/295
See application file for complete search history.

(56) References Cited

U.S. PATENT DOCUMENTS

| | | | |
|---|---|---|---|
| 2004/0098979 A1* | 5/2004 | Hammerle et al. | 60/295 |
| 2007/0062179 A1* | 3/2007 | Leone | 60/285 |
| 2007/0144151 A1 | 6/2007 | Lueders et al. | |
| 2007/0144152 A1 | 6/2007 | Lueders | |
| 2007/0175208 A1* | 8/2007 | Bandl-Konrad et al. | 60/286 |
| 2008/0022657 A1* | 1/2008 | Pierpont et al. | 60/285 |
| 2008/0271440 A1* | 11/2008 | Xu et al. | 60/295 |
| 2008/0282670 A1* | 11/2008 | McCarthy et al. | 60/274 |
| 2008/0295482 A1 | 12/2008 | Gonze et al. | |
| 2009/0288394 A1* | 11/2009 | Kesse et al. | 60/286 |

FOREIGN PATENT DOCUMENTS

DE 10043798 A1 * 3/2002

OTHER PUBLICATIONS

English translation of DE 10043798 A1.*

* cited by examiner

*Primary Examiner* — Thomas Denion
*Assistant Examiner* — Jason Shanske
(74) *Attorney, Agent, or Firm* — Julia Voutyras; Alleman Hall McCoy Russell & Tuttle LLP

(57) ABSTRACT

Various systems and methods are described for controlling a selective catalytic reduction system coupled to an exhaust system of an engine, the selective catalytic reduction system including a catalyst and a diesel particulate filter. One example method comprises, before regeneration of the diesel particulate filter, adjusting an operating parameter to decrease an amount of ammonia stored in the SCR catalyst to a desired amount of stored ammonia, where the desired amount of ammonia storage is varied based on operating conditions, and initiating regeneration of the catalyst when the desired amount of stored ammonia is reached.

19 Claims, 5 Drawing Sheets

SCR CATALYST HEATING CONTROL

TECHNICAL FIELD

The present application relates generally to an emission control system coupled to an exhaust system of an engine.

BACKGROUND AND SUMMARY

An emission control system may be a diesel aftertreatment system which includes a selective catalytic reduction (SCR) catalyst and a diesel particulate filter (DPF). When a DPF is used, thermal regeneration may be employed to clean the filter by increasing the temperature and burning soot that has collected in the filter. As the temperature of the DPF increases, the temperature of the SCR catalyst may also increase. Ammonia that is used as a reductant in the catalyst may be desorbed from the SCR catalyst when the temperature increases resulting in ammonia slip from the catalyst. The slipped ammonia may exit the tailpipe and enter the atmosphere and/or the ammonia may be oxidized when passing through the DPF to form $NO_x$, thus increasing nitrogen oxide ($NO_x$) emissions.

One approach to reduce ammonia slip during regeneration is disclosed in US Patent Application Publication 2007/0144152. In the cited reference, a supply of reducing agent is reduced before and during thermal regeneration. By reducing the amount of reducing agent, stored ammonia may be consumed before it is desorbed due to the increased temperature necessary for regeneration and, thus, ammonia slip may be reduced.

Consumption of the stored ammonia may happen slowly as the ammonia is consumed when it reacts with $NO_x$ in the exhaust stream flowing through the catalyst. Engine operating conditions, such as an amount of exhaust gas recirculation entering the combustion chambers, may impact (e.g., increase or decrease) the amount of $NO_x$ in the exhaust gas varying the time for ammonia consumption and possibly delaying the regeneration of the DPF which may result in an increase of particulate emissions.

The inventors herein have recognized the above problems and have devised various approaches to at least partially address them. Thus, a method for controlling a diesel aftertreatment system coupled to an exhaust system of an engine, the diesel aftertreatment system including an SCR catalyst and a diesel particulate filter, is disclosed. The method comprises, before regeneration of the diesel particulate filter, adjusting an operating parameter to decrease an amount of ammonia stored in the SCR catalyst to a desired amount of stored ammonia, where the desired amount of stored ammonia is varied based on operating conditions, and initiating regeneration of the catalyst when the desired amount of stored ammonia is reached.

Specifically, in one example, the overall amount of $NO_x$ emission, and thus the desired amount of ammonia stored in the catalyst, may be reduced before regeneration and may further be based on an amount of $NO_x$ generated to reduce ammonia while the catalyst is increasing in temperature. In this manner, heating for regeneration of the DPF may be controlled based on the amount of stored ammonia so that there is a reduced amount of ammonia slip from the catalyst as well as a reduced amount of $NO_x$ emission from the tailpipe during thermal regeneration of the catalyst.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling a diesel aftertreatment system which includes an SCR catalyst and a diesel particulate filter (DPF) coupled to an exhaust system in an engine of a motor vehicle. When an approaching thermal regeneration of the diesel particulate filter is detected, the catalyst enters a first of three phases in which the exhaust temperature is increased while urea injection to the catalyst is decreased and $NO_x$ conversion efficiency increases. Upon reaching a first threshold temperature, the catalyst enters a second phase where urea injection is cut-off and $NO_x$ emission from the engine is increased in order to quickly consume remaining ammonia that is stored in the catalyst. The temperature is further increased during the second phase in response to a decreasing amount of stored ammonia. During the third phase, once a desired amount of stored ammonia is reached and $NO_x$ conversion efficiency begins to decrease, regeneration of the DPF is initiated and $NO_x$ emission from the engine is decreased. In this manner, thermal regeneration of the DPF may be achieved in a desired amount of time while ammonia slip from the catalyst is reduced.

Figure 1:
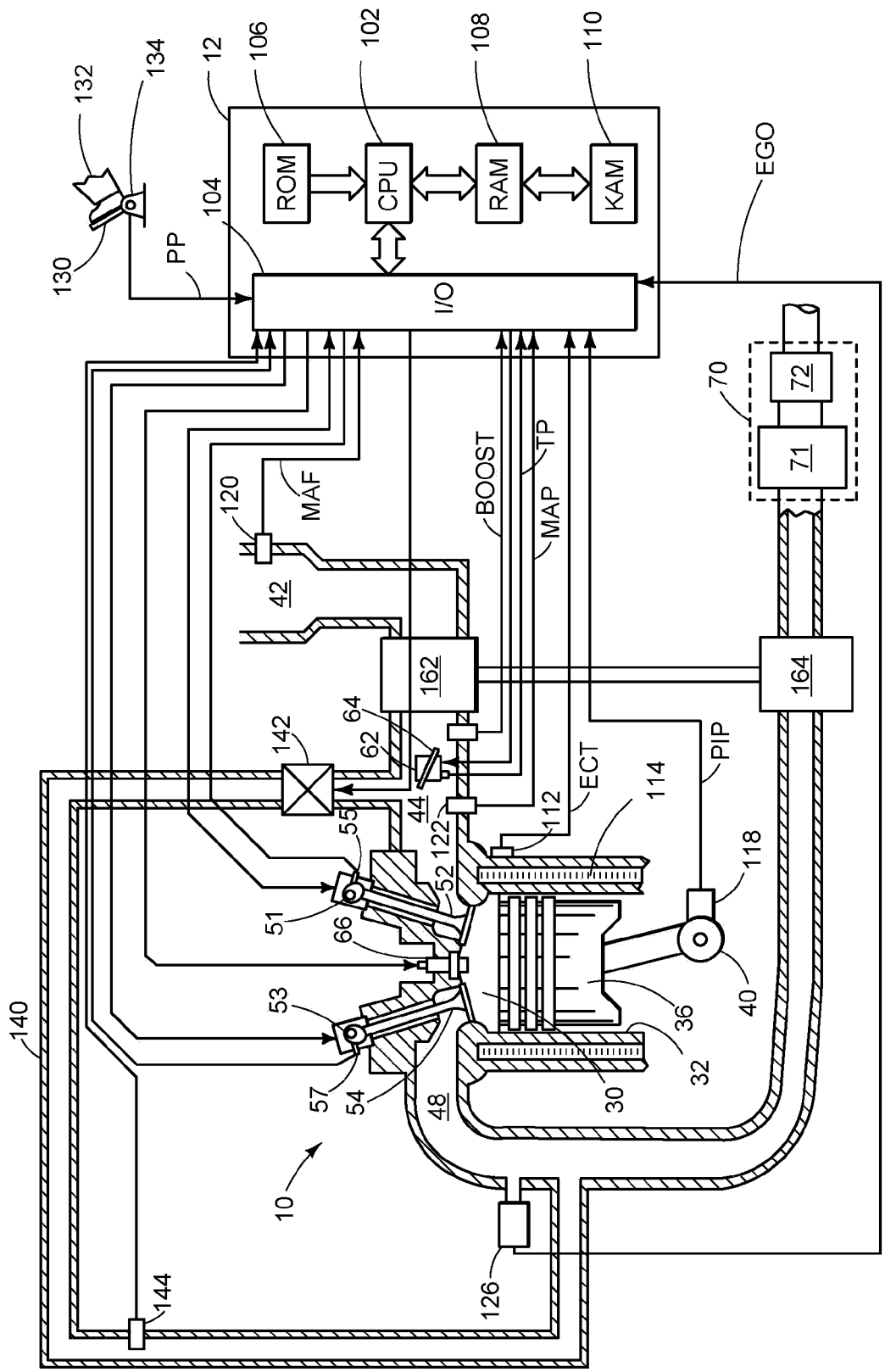
FIG. 1 shows a schematic diagram of an engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein. Fuel injection may be via a common rail system, or other such diesel fuel injection system. Fuel may be delivered to fuel injector 66 by a high pressure fuel system (not shown) including a fuel tank, a fuel pump, and a fuel rail.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Further, in the disclosed embodiments, an exhaust gas recirculation (EGR) system may route a desired portion of exhaust gas from exhaust passage 48 to intake passage 44 via EGR passage 140. The amount of EGR provided to intake passage 48 may be varied by controller 12 via EGR valve 142. Further, an EGR sensor 144 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust O2 sensor and/or an intake oxygen sensor (intake manifold)]. Under some conditions, the EGR system may be used to regulate the temperature of the air and fuel mixture within the combustion chamber. While FIG. 1 shows a high pressure EGR system, additionally, or alternatively, a low pressure EGR system may be used where EGR is routed from downstream of a turbine of a turbocharger to upstream of a compressor of the turbocharger.

As such, Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control system 70 is shown arranged along exhaust passage 48 downstream of exhaust gas sensor 126. System 70 may be a selective catalytic reduction (SCR) system, a three way catalyst (TWC), $NO_x$ trap, various other emission control devices, or combinations thereof. For example, device 70 may be an exhaust aftertreatment system which includes an SCR catalyst 71 and a diesel particulate filter (DPF) 72. In some embodiments, DPF 72 may be located downstream of the catalyst (as shown in FIG. 1), while in other embodiments, DPF 72 may be positioned upstream of the catalyst (not shown in FIG. 1). As will be described in more detail below, the DPF may be thermally regenerated periodically during engine operation. Further, in some embodiments, during operation of engine 10, emission control system 70 may be periodically reset by operating at least one cylinder of the engine within a particular air/fuel ratio.

In one example, a urea injection system may be provided to inject liquid urea to SCR catalyst 71. However, various alternative approaches may be used, such as solid urea pellets that generate an ammonia vapor, which is then injected or metered to SCR catalyst 71. In still another example, a lean NOx trap may be positioned upstream of SCR catalyst 71 to generate ammonia for the SCR catalyst, depending on the degree or richness of the air-fuel ratio fed to the Lean NOx trap.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
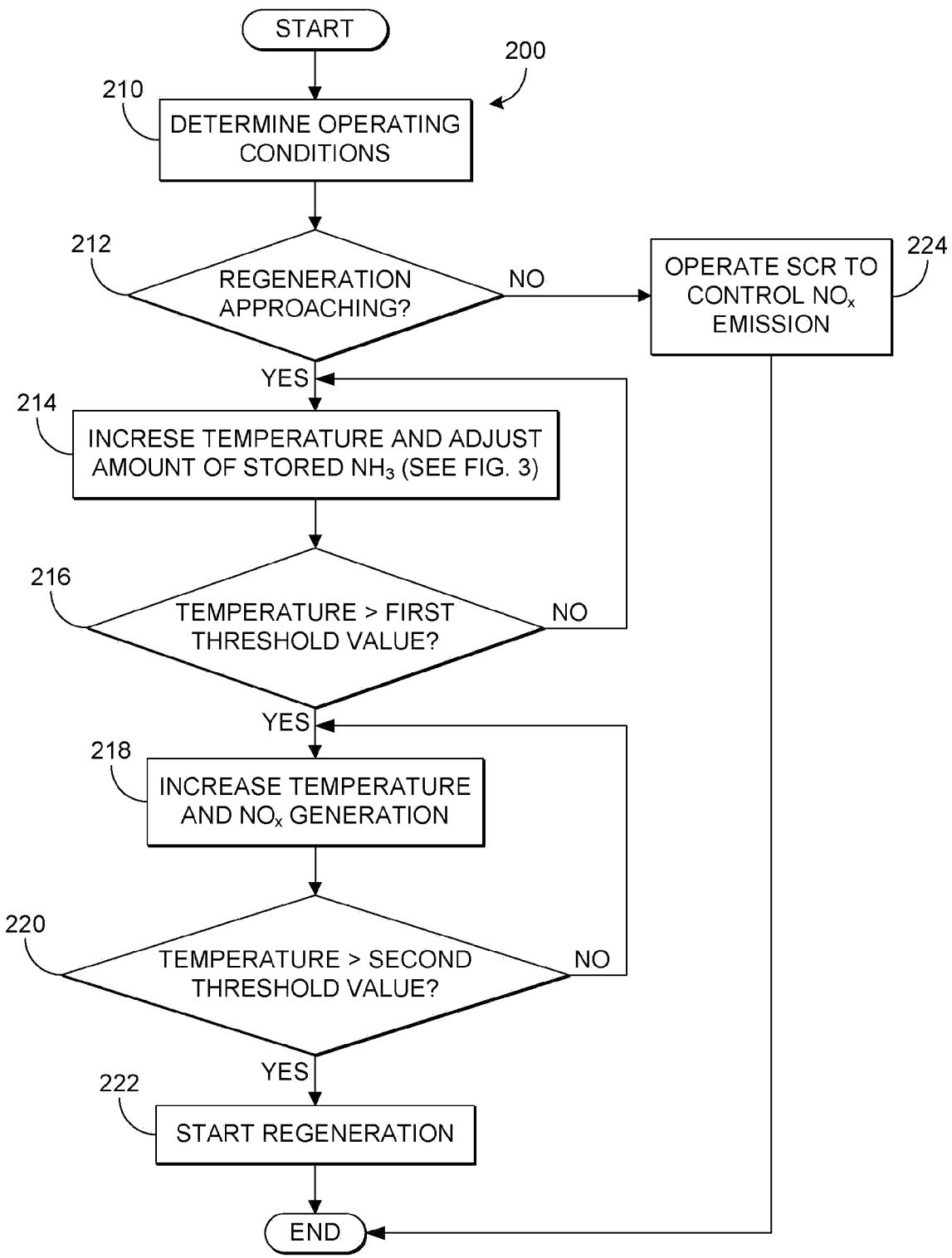
FIG. 2 shows a flow chart illustrating a control routine for a diesel aftertreatment system.

Referring now to FIG. 2, the flow chart shown in FIG. 2 illustrates a routine 200 for controlling the diesel aftertreatment system during a period leading up to a thermal regeneration of the diesel particulate filter. The thermal regeneration of the filter may be initiated in response to a regeneration request, such as based on an amount of particulate stored in the filter, a pressure drop across the filter reaching a threshold value, etc. Specifically, routine 200 controls the temperature of the diesel aftertreatment system leading up to the regeneration of the DPF based on variables such as ammonia storage and $NO_x$ conversion efficiency of the catalyst. Further, during regeneration, additional adjustments may also be provided.

At 210 of routine 200, engine operating conditions are determined. The operating conditions may include, but are not limited to, air-fuel ratio and amount of exhaust gas recirculation, etc.

Once the engine operating conditions are determined, routine 200 proceeds to 212 where it is determined if a regeneration is approaching. In some embodiments, for example, the filter load of a diesel particulate filter may reach a threshold level generating a regeneration request. If it is determined that regeneration is not approaching, routine 200 moves to 224 and the SCR system continues to operate to control $NO_x$ emission in the exhaust, for example, providing reductant injection based on engine speed, engine load, a desired level of stored ammonia in the SCR catalyst (see FIG. 3), etc. On the other hand, if it is determined that regeneration is approaching or requested, routine 200 continues to 214 where a first phase begins and the temperature of the catalyst begins increasing and the desired amount of ammonia ($NH_3$) stored in the SCR catalyst is adjusted (e.g., reduced), as described further with regard to FIG. 3. In some embodiments, the temperature of the catalyst may be increased via a heater. In other embodiments, the temperature of the exhaust gas may be increased in order to raise the temperature of the catalyst. Further, if the source of ammonia is from a liquid urea injection, the amount of urea injected to the SCR catalyst may be reduced or cut-off, for example, in order to provide a reduced desired storage level of ammonia in the SCR catalyst. In another example, if the source of stored ammonia is from a lean $NO_x$ trap, the air-fuel ratio may be increased so that it is less rich and less ammonia is generated. Further details of the ammonia storage level control are described with regard to the control routine 300 for adjusting the amount of ammonia stored in the SCR catalyst as illustrated in FIG. 3.

Figure 3:
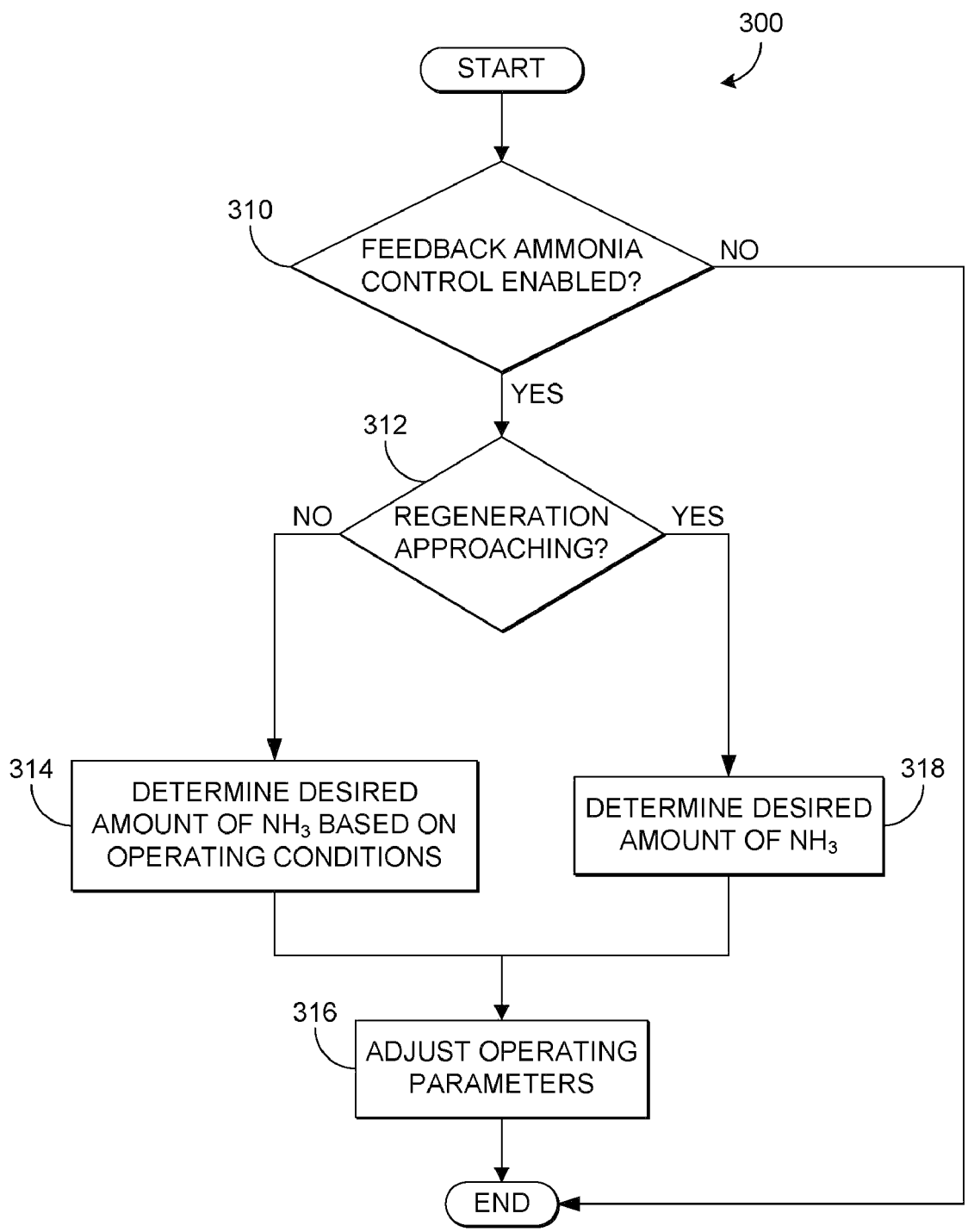
FIG. 3 shows a flow chart illustrating a control routine for adjusting an amount of ammonia stored in an SCR catalyst.

Specifically, at 310 of FIG. 3, it is determined if feedback control of ammonia storage level in the SCR catalyst is enabled. If feedback control is not enabled, the routine ends. On the other hand, if feedback control is enabled, routine 300 proceeds to 312 where it is determined if regeneration is approaching. The regeneration request may be detected as described above.

If it is determined that regeneration is not approaching, routine 300 continues to 314 where a desired amount of ammonia stored in the SCR catalyst is determined. The desired amount of ammonia may be based on current operating conditions. For example, if the amount of exhaust gas recirculation (EGR) is high and, thus, $NO_x$ formation is low, the catalyst may require a lower amount of stored $NO_x$ as opposed to conditions when the amount of EGR is low, and vice versa. Once the desired amount of stored ammonia is determined, routine 300 proceeds to 316 where operating parameters are adjusted to assist in increasing or decreasing the amount of ammonia stored in the SCR catalyst. As an example, urea injection may be increased if it is determined that an increased amount of stored ammonia is desired. As another example, the air-fuel ratio of the exhaust fed to an upstream lean NOx trap may be adjusted to be more or less rich (to generate more or less ammonia, respectively) based on the desired amount of stored ammonia in the catalyst.

If it is determined that regeneration of the DPF is approaching, routine 300 moves to 318 where a desired pre-regeneration amount of stored ammonia is determined. Specifically, the desired amount of stored ammonia may be based on, and take into account, the impending regeneration of the DPF. For example, in order to reduce ammonia slip from the catalyst, the desired amount of stored ammonia may be set lower compared to the desired amount during engine operation when regeneration is not approaching. Further, the desired amount of stored ammonia may be based on an amount of stored particulate that is to be regenerated.

After the desired amount of stored ammonia for regeneration is determined, routine 300 moves to 316 where operating parameters are adjusted. For example, in order to decrease the amount of stored ammonia, the exhaust air-fuel ratio may be increased so as to decrease the amount of ammonia generated at a lean $NO_x$ trap, or urea injection may be reduced, or others.

In this way, it is possible to anticipate the impending filter regeneration and prepare the SCR catalyst, specifically its ammonia storage level, for such operation. As will be described further below herein, by anticipating the impending filter regeneration, the amount of stored ammonia in the SCR catalyst can be adjusted to a desired level before the increased high temperature of regeneration occurs. In one example, the amount of stored ammonia is decreased during an initial increase in temperature during the first phase. Further, the desired level of stored ammonia in the SCR catalyst can be different from that used during non-regeneration condition, and further the desired storage level of ammonia in anticipation of DPF regeneration may be varied depending on the particular parameters of the regeneration (e.g., the anticipated length of the regeneration, the anticipated peak temperature of the regeneration, etc.) However, the management of ammonia storage level, reductant injection, $NO_x$ generation, and temperature, can have various interrelated effects on one another, and thus a coordinated control approach is described herein, as will be explained in relation to FIGS. 3-5 and as further described with regard to FIG. 2, below.

Figure 4:
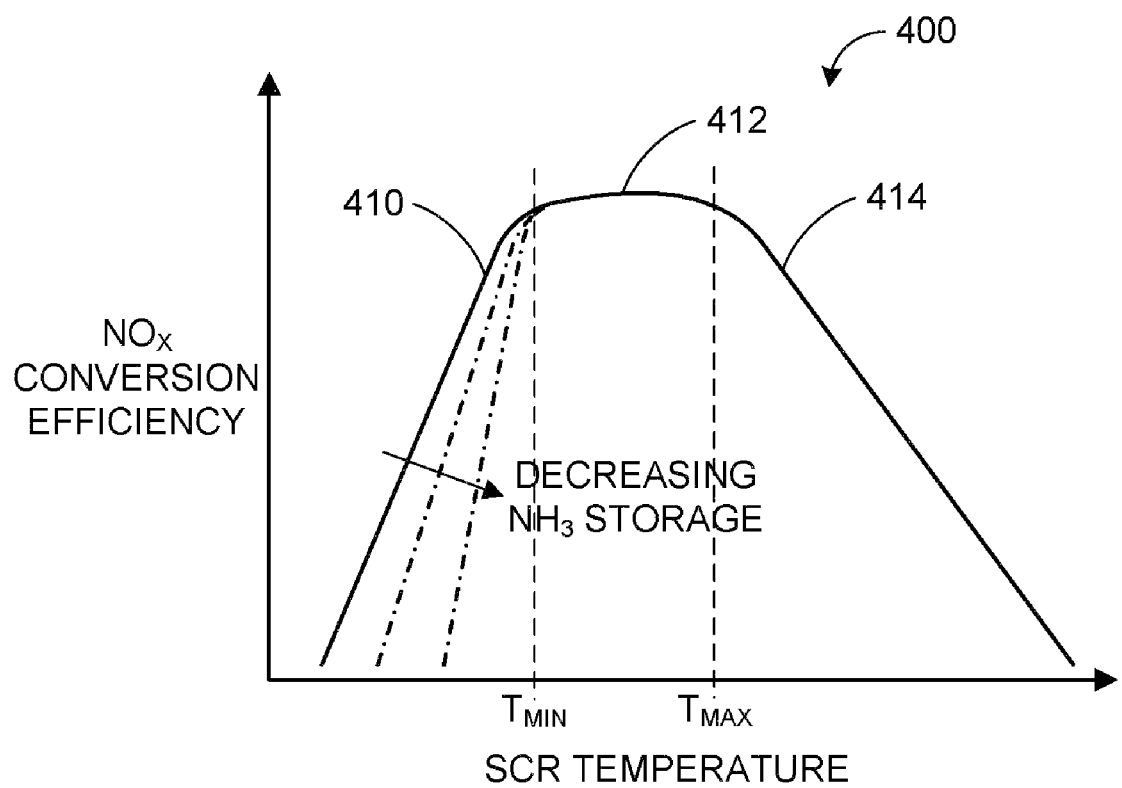
FIG. 4 shows a graph demonstrating a relationship between SCR temperature and $NO_x$ conversion efficiency.

FIG. 4 shows a graph 400 which demonstrates the relationship between the SCR system temperature and $NO_x$ conversion efficiency before and during thermal regeneration. Section 410 of graph 400 corresponds to the first phase when it is determined that regeneration is approaching and the temperature of the catalyst begins increasing. As depicted in graph 400 at section 410, as the temperature of the catalyst increases, the $NO_x$ conversion efficiency increases. In addition, section 410 of graph 400 shows as ammonia storage decreases, the $NO_x$ conversion efficiency decreases for a given temperature.

Turning back to FIG. 2, at 216 of routine 200, it is determined if the temperature of the catalyst is greater than a first threshold value (labeled "$T_{min}$" in FIG. 4). If the temperature is not greater than the first threshold value, routine 200 returns to 214 where the temperature of the catalyst continues to increase. If it is determined that the temperature of the catalyst is greater than the first threshold value, routine 200 proceeds to 218 where a second phase begins and the temperature of the catalyst is further increased and $NO_x$ generation is increased. The second phase corresponds to section 412 of graph 400 in FIG. 4. During the second phase, the catalyst temperature may increase based on the amount of ammonia stored in the catalyst. For example, as the amount of stored ammonia decreases, the catalyst temperature may increase.

Increasing the amount of $NO_x$ generated by the engine may further increase ammonia consumption, and thus, ammonia slip during regeneration may be reduced. $NO_x$ generation may be increased via one or more methods. For example, in some embodiments, $NO_x$ generation may be increased by decreasing an amount of exhaust gas recirculation. In other embodiments, $NO_x$ generation may be increased by advancing fuel injection timing.

Continuing with FIG. 2, at 220 of routine 200, it is determined if the catalyst temperature is greater than a second threshold value (labeled "$T_{max}$" in FIG. 4) which is greater than the first threshold value. If the catalyst temperature is less than the second threshold value, routine 200 returns to 218 and the temperature continues to increase. On the other hand, if the temperature is greater than a threshold value and the amount of stored ammonia has reached a desired value, a third phase begins and thermal regeneration is initiated at 222 of routine 200. Once regeneration begins, the temperature continues to increase and $NO_x$ conversion efficiency decreases. The third phase corresponds to section 414 of graph 400 in FIG. 4.

Figure 5:
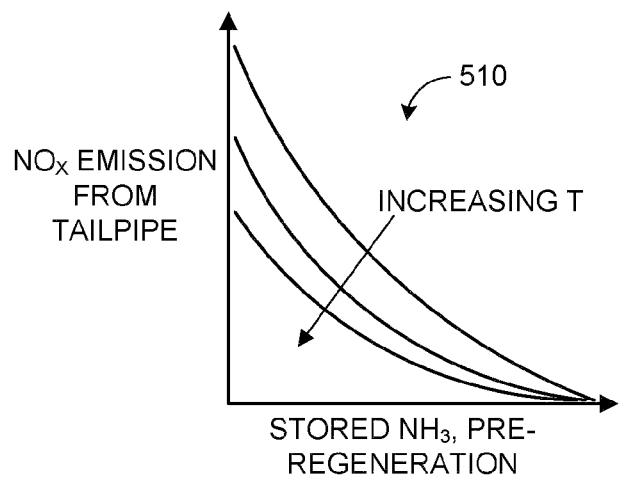
FIG. 5 shows a series of graphs indicating $NO_x$ emission based on an amount of ammonia stored in the catalyst.
Figure 5:
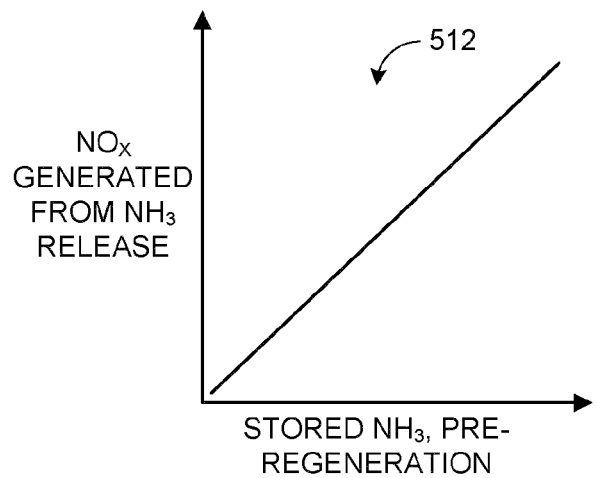
Figure 5:
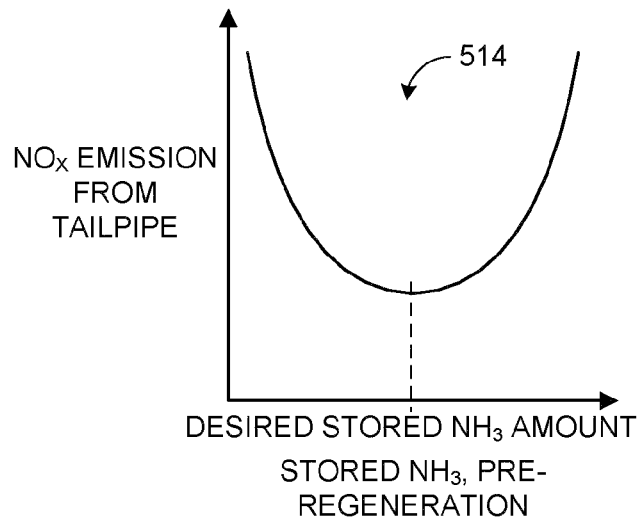

Furthermore, the desired amount of stored ammonia to begin catalyst regeneration may be determined as described with respect to FIG. 5. Graph 510 in FIG. 5 shows the dependence of $NO_x$ emission from the tailpipe on the pre-regeneration amount of ammonia stored in the catalyst when the DPF is positioned downstream of the SCR catalyst. As shown, when there is a greater amount of stored ammonia, there is less $NO_x$ emission, as there is more ammonia to reduce $NO_x$ in the exhaust gas. Further, as the temperature of the catalyst increases, there is even less $NO_x$ emission for a given amount of ammonia storage. Graph 512 in FIG. 5 shows the dependence of the amount of $NO_x$ generated during the second phase (described above) on the amount of stored ammonia, pre-regeneration. When there is a larger amount of ammonia stored, a greater amount of $NO_x$ may be generated to react with the ammonia in order to prevent ammonia slip.

A result of combining graphs 510 and 512 is depicted in FIG. 5 at graph 514. Graph 514 shows the dependence of the overall $NO_x$ emission from the tailpipe on the amount of ammonia stored in the catalyst pre-regeneration. As shown in graph 514, if the amount of stored ammonia is too high or too low, there will be a greater amount of $NO_x$ emission from the tailpipe.

As described, for selective catalytic reduction catalyst control before a diesel particulate filter regeneration, the first phase occurs before the second phase and the second phase occurs before the third phase. In one example embodiment, a request to regenerate the diesel particulate filter may initiate the first phase of SCR catalyst control. During the first phase which corresponds to section 410 of graph 400 in FIG. 4, the temperature of the catalyst may be increased while the amount of urea injected to the catalyst is reduced or cut-off in order to decrease the amount of stored ammonia in the catalyst. The $NO_x$ conversion efficiency may increase throughout the first phase and the temperature of the catalyst may be increased in response to a decreased amount of ammonia storage.

Once the SCR catalyst reaches the first threshold temperature, the second phase of catalyst control, corresponding to section 412 of graph 400, may be initiated. During the second phase, the $NO_x$ conversion efficiency may continue to increase and $NO_x$ emission from the engine may be increased by decreasing an amount of exhaust gas recirculation, for example, in order to increase the rate at which stored ammonia is consumed. As the amount of stored ammonia continues to decrease, the temperature of the catalyst may be further increased. When the amount of stored ammonia decreases to a desired amount and the SCR catalyst reaches a second threshold temperature, the second threshold temperature being greater than the first threshold temperature, the third phase of catalyst control is initiated.

During the third phase, which corresponds to section 414 of graph 400 in FIG. 4, the temperature of the catalyst may continue to increase above the second threshold value and regeneration of the diesel particulate filter is initiated. As the temperature continues to increase, the $NO_x$ conversion efficiency decreases and the amount of $NO_x$ generated by the engine may be reduced. Due to the reduced amount of ammonia to the desired amount, ammonia slip from the catalyst may be reduced during the regeneration of the DPF that occurs at high exhaust temperatures.

In other embodiments, the transitions between the phases of catalyst control before regeneration of a diesel particulate filter may be based on the $NO_x$ conversion efficiency of the SCR catalyst, for example, rather than temperature of the catalyst. As an example, during the first phase, once the $NO_x$ conversion efficiency reaches a desired value (or goes above a threshold conversion efficiency) or a desired rate of change (or drops below a rate of change of conversion), the second phase may be initiated. The third phase may be initiated when the $NO_x$ conversion efficiency reaches a second desired value (or drops below a threshold value) or desired rate of change (or drops below a threshold value—as the conversion efficiency decreases, the rate of change may go negative). For example, the routine may limit the SCR catalyst temperature based on the stored ammonia to avoid ammonia slip. That is to say, the routine may drive to higher exhaust temperature as quickly as possible, but the stored ammonia will limit the catalyst temperature so that operation may continue while avoiding NH3 slip. Thus, during the first and/or second phase, the routine may use the stored NH3 level as an exhaust temp limiter, with different temperature limits corresponding to different ammonia storage levels (e.g., the temperature limit may be increased as the stored ammonia level decreases, and vice versa). As another example, the routine may control exhaust temperature responsive to the level of stored ammonia, the exhaust temperature increasing as the stored level of ammonia decreases.

As described above, heating for regeneration of a diesel particulate filter may be controlled in such a manner so as to reduce ammonia slip from the SCR catalyst. Regeneration may be initiated once the stored ammonia is reduced to a desired amount. The desired amount of stored ammonia may be based on $NO_x$ emission from the tailpipe before regeneration when the DPF is positioned downstream of the catalyst and an amount of $NO_x$ generated to reduce ammonia while the catalyst is increasing in temperature. Additionally, by controlling $NO_x$ emission from the engine while decreasing the amount of ammonia stored in the catalyst, regeneration may be initiated in a desired amount of time.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling a diesel aftertreatment system including an SCR catalyst and a particulate filter coupled to an engine, comprising:
before regenerating the particulate filter, reducing exhaust gas recirculation to decrease a stored ammonia amount in the SCR catalyst to a desired pre-regeneration amount of stored ammonia, the desired pre-regeneration amount varied based on an anticipated peak regeneration temperature; and
initiating particulate filter regeneration when the desired pre-regeneration amount is reached.

2. The method of claim 1, wherein decreasing the stored ammonia amount includes cutting-off urea injection, the desired pre-regeneration amount based on an amount of particulates stored in the particulate filter to be regenerated.

3. The method of claim 1, wherein decreasing the stored ammonia amount includes increasing an amount of $NO_x$ generated in an engine.

4. The method of claim 1, wherein exhaust air-fuel ratio is increased in response to a request to decrease the stored ammonia amount of in the SCR catalyst.

5. The method of claim 1, wherein decreasing the stored ammonia amount in the SCR catalyst to the desired pre-regeneration amount includes, during a first phase, increasing a temperature of the SCR catalyst, without increasing $NO_x$ generation from an engine, to a first threshold value while decreasing the stored ammonia amount to a first level, and during a second phase, increasing $NO_x$ generation while increasing the SCR catalyst temperature to a second threshold value.

6. The method of claim 1, wherein decreasing the stored ammonia amount in the SCR catalyst to the desired pre-regeneration amount includes, during a first phase, increasing a $NO_x$ conversion efficiency, without increasing $NO_x$ generation from an engine, to a first threshold value while decreasing the amount of stored ammonia amount to a first level, and during a second phase, increasing $NO_x$ generation until the $NO_x$ conversion efficiency decreases to a second threshold value, and wherein the $NO_x$ conversion efficiency of the SCR catalyst decreases after particulate filter regeneration is initiated.

7. The method of claim 1, wherein the particulate filter is positioned downstream of the SCR catalyst, and wherein the desired pre-regeneration amount is varied based on an anticipated length of the particulate filter regeneration.

8. The method of claim 1, wherein the particulate filter is positioned upstream of the SCR catalyst.

9. A method for an aftertreatment system including an SCR catalyst and a particulate filter, comprising:
first, increasing SCR catalyst temperature to a first threshold while decreasing stored ammonia without increasing engine $NO_x$ generation; then
increasing engine $NO_x$ generation while increasing SCR catalyst temperature to a second threshold; and
when SCR catalyst temperature is above the second threshold and the stored ammonia has reached a desired pre-regeneration value, initiating a particulate filter regeneration.

10. The method of claim 9, wherein, the SCR catalyst temperature is increased in response to a decreased amount of stored ammonia.

11. The method of claim 9, wherein engine $NO_x$ generation is increased by decreasing an amount of exhaust gas recirculation.

12. The method of claim 9, wherein engine $NO_x$ generation is increased by advancing fuel injection timing.

13. The method of claim 9, wherein the first threshold is less than the second threshold.

14. The method of claim 9, wherein $NO_x$ conversion efficiency of the SCR catalyst increases before the SCR catalyst temperature reaches the first threshold.

15. The method of claim 9, wherein $NO_x$ conversion efficiency begins decreasing when the SCR catalyst temperature reaches the second threshold.

16. The method of claim 9, wherein increasing SCR catalyst temperature to the first threshold while decreasing the stored ammonia without increasing engine $NO_x$ generation is initiated in response to a request to regenerate the particulate filter.

17. A system for a diesel aftertreatment device coupled to an exhaust system of an engine in a vehicle, the system comprising:
an SCR catalyst;
a diesel particulate filter;
a control system comprising a computer readable storage medium, the medium including instructions thereon, the control system receiving communication from a selective catalytic reduction device, the medium comprising:
instructions for, before a regeneration of the diesel particulate filter and during a first phase, increasing SCR catalyst temperature to a first threshold value and decreasing an amount of stored ammonia without increasing engine $NO_x$ generation;
instructions for, before regeneration of the diesel particulate filter and during a second phase, increasing engine $NO_x$ generation while increasing the SCR catalyst temperature to a second threshold value based on the amount of stored ammonia; and
instructions for initiating a regeneration of the diesel particulate filter during a third phase when the SCR catalyst temperature is above the second threshold value and the amount of stored ammonia has reached a desired pre-regeneration value.

18. The system of claim 17, further comprising instructions for cutting off urea injection during the first phase and resuming urea injection during the third phase, and instructions for limiting exhaust temperature during the first and second phases based on the amount of stored ammonia, a temperature limit increased as the stored ammonia decreases.

19. The system of claim 17, wherein a $NO_x$ conversion efficiency increases during the first phase and decreases during the third phase.

* * * * *